(12) United States Patent
Haung et al.

(10) Patent No.: US 7,962,126 B2
(45) Date of Patent: Jun. 14, 2011

(54) MULTIMEDIA-MESSAGING-SERVICE (MMS) SYSTEM AND THE SERVICE METHOD THEREOF

(75) Inventors: Yieh-Ran Haung, Hsinchu (TW); Yu-Lung Chen, Kaohsiung (TW); Wen-Cheng Lin, Changhua (TW)

(73) Assignee: Yuan Ze University, Taoyuan County (TW)

( * ) Notice: Subject to any disclaimer, the term of this patent is extended or adjusted under 35 U.S.C. 154(b) by 1310 days.

(21) Appl. No.: 11/518,922

(22) Filed: Sep. 12, 2006

(65) Prior Publication Data

US 2008/0002726 A1    Jan. 3, 2008

(30) Foreign Application Priority Data

Jun. 30, 2006  (TW) ............................... 95123844 A (51) Int. Cl.
*H04M 1/66* (2006.01)
(52) U.S. Cl. .................. 455/412.2; 455/412.1; 455/466; 455/414.1; 455/556.1; 455/557; 455/458; 455/415

(58) Field of Classification Search ............... 455/414.1, 455/414.2
See application file for complete search history.

(56) References Cited

U.S. PATENT DOCUMENTS

| 2004/0078439 | A1* | 4/2004 | Staack ........................ 709/206 |
| 2004/0111476 | A1* | 6/2004 | Trossen et al. ............... 709/206 |
| 2007/0190985 | A1* | 8/2007 | Bai et al. ..................... 455/414.1 |

* cited by examiner

*Primary Examiner* — Charles N Appiah
*Assistant Examiner* — Randy Peaches
(74) *Attorney, Agent, or Firm* — Rosenberg, Klein & Lee (57) ABSTRACT

A multimedia-messaging-service (MMS) system and the service method thereof are provided. The MMS system integrates the mobility management scheme of a GSM/GPRS/UMTS mobile network and the broadband transmission service of a wireless LAN, and has a user authentication and a location management. The MMS system uses a MMS server to communicate with a wireless LAN, a GSM/GPRS/UMTS mobile network and an Internet for providing the MMS service including user registration, message submission, message forwarding, message notification, message retrieval and location update.

23 Claims, 9 Drawing Sheets

FIG 8B

MULTIMEDIA-MESSAGING-SERVICE (MMS) SYSTEM AND THE SERVICE METHOD THEREOF

BACKGROUND OF THE INVENTION

1. Field of the Invention

The present relates to a multimedia messaging service (MMS) system and the service method thereof, in particular, to an MMS system and the service method thereof in which integrates mobility management mechanisms of GSM/GPRS/UMTS mobile network and wideband transmission services of wireless local area network (WLAN), and enables user authentication and location management.

2. Description of Related Art

GSM Short Messaging Service (SMS) has now become the most successful wireless data service ever since 1992. GSM short message service allows only mobile users to transfer and receive text short messages of no more than 160 characters. Accordingly, in order to create more revenue from current GSM networks, mobile phone operators promoted Enhanced Messaging Service (EMS), offering user features of enhanced messaging services for transferring and receiving combinations of texts, simple pictures and music, which can be considered as extensions of GSM short message service; that is, each enhanced short message is treated as a series of GSM short messages. Succeeding to the enhanced messaging service, era of Multimedia Messaging Service (MMS) emerges.

Figure 1:
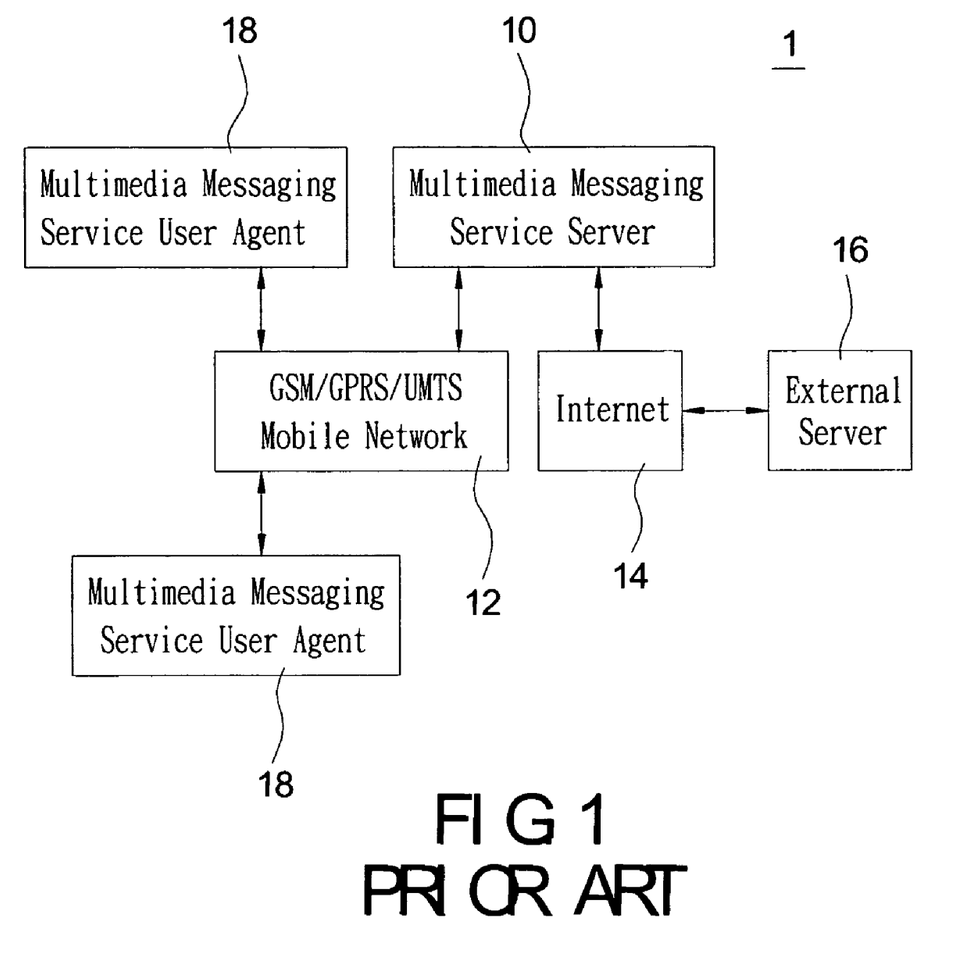
FIG. 1 illustrates a diagram of a multimedia messaging service system environment.

Multimedia messaging service provides message transmissions among mobile devices, as well as between applications and mobile devices, offering integral and various contents, including: texts, pictures, audio and video. Multimedia messaging system can join different networks and networks of different types, and integrate existing short messaging systems, forming the Multimedia Messaging Service Environment (MMSE). Now refer to FIG. 1, which illustrates a diagram of a multimedia messaging service system environment. As shown in FIG. 1, in a multimedia messaging service system environment 1, a Multimedia Messaging Service Server (MMS Server) 10 joins a GSM/GPRS/UMTS mobile network 12 and Internet 14, and integrates the short message service elements into these networks to provide user with services of multimedia messaging transmission. The GSM/GPRS/UMTS mobile network 12 comprises second generation (2G) mobile networks (e.g. GSM, GPRS) and third generation (3G) mobile networks (e.g. UMTS). In brief, the multimedia messaging service server 10 is responsible for handling multimedia messages, and takes advantage of data transmission services provided in various networks to send content-rich multimedia messaging. In addition, the multimedia messaging service server 10 also offers convergent functions between the Multimedia Messaging Service User Agent (MMS User Agent) 18 and the External Server 16, such that various servers in different networks can be integrated. The multimedia messaging service server agent 18 provides multimedia message service user with functions for viewing, editing and processing multimedia messaging. The external server 16 is coupled to servers in various types of networks. For example, in the multimedia messaging service environment 1, the GSM/GPRS mobile stations or UMTS user equipments consisting of the multimedia messaging service server agent 18 can utilize the mobile network services provided by the GSM/GPRS/UMTS mobile network 12, submitting and retrieving multimedia messages via the multimedia messaging service server 10. Besides, the GSM/GPRS mobile stations or UMTS user equipments can also receive emails from the external server 16 (e.g. email servers), or submit multimedia messaging to users of the external server 16, through the multimedia messaging service server 10.

The GSM/GPRS/UMTS mobile network 12 can actually provide data transmission rates of only 9.6/50/300 kbps, resulting in the contents which short message service can provide are not only lack of diversity, but expensive in service charge. Insufficiency of wireless bandwidth has now become one tough issue with which the GSM/GPRS/UMTS mobile network 12 is confronted for providing multimedia messaging service. Thus, in case the problem of bandwidth insufficiency can be solved, multimedia messaging service will facilitate to create a win-win result for both users and network service vendors. Among various wireless technologies currently used, wireless local are network (WLAN) is the only one which allows for wireless broadband transmission service, but, however, WLAN may not provide a good mobility management mechanism as the GSM/GPRS/UMTS mobile network 12 does. Hence, it is possible to provide mobile users with content-rich multimedia messaging service, supposing the mobility management mechanism of the GSM/GPRS/UMTS mobile network 12 and the broadband transmission service of WLAN can be well integrated.

Still, current mobile application services are dominated by the system operators of the GSM/GPRS/UMTS mobile network 12 to an extremely high extent; thus, if only integrating the mobility management mechanism of the GSM/GPRS/UMTS mobile network 12 and the broadband transmission service of WLAN, though being effective for multimedia messaging service provision, the business model, user authentication and user location management thereof will surely become under the control of the operators of the GSM/GPRS/UMTS mobile network 12, which is unfavorable for other competitors to participate, furthermore adversely effecting the promotion and application of multimedia messaging service as well. Therefore, for the purpose of providing multimedia messaging service and enhancing the promotion thereof as well as application, in addition to integrating the mobility management mechanism of the GSM/GPRS/UMTS mobile network 12 and the broadband transmission service of WLAN, it is required to design a set of user authentication and location management mechanism completely independent of the GSM/GPRS/UMTS mobile network 12.

SUMMARY OF THE INVENTION

In view of this, the present invention provides a multimedia messaging service (MMS) system and the service method thereof, wherein the purpose the present invention is to integrate the mobility management mechanism of the GSM/GPRS/UMTS mobile network and the broadband transmission service of WLAN, and to propose an authentication and location management method independent of the GSM/GPRS/UMTS mobile network, allowing to establish a $WG^2U$ (WLAN and GSM/GPRS/UMTS) multimedia messaging service system having the following features:

1. Instant messaging notification: $WG^2U$ multimedia messaging service users will receive instantaneously notification for message arrival, relevant information of notification message, including: sender's address, message subject, class, size, priority and media type etc.

2. Content-rich and high-speed messaging access: $WG^2U$ multimedia messaging service users can rapidly submit and retrieve multimedia messaging with integral and diverse contents, including: texts, pictures, audio, video and the like.

3. Convergent messaging service: $WG^2U$ multimedia messaging service users can receive messaging from various types of servers, and submit messaging to thereto as well, including: email server, voice box server and so on.

4. Operator-independent user management: $WG^2U$ multimedia messaging service system offers user authentication and location management method independent of GSM/GPRS/UMTS mobile network, allowing business operations of multimedia messaging service, without restrictions from GSM/GPRS/UMTS mobile network system operators.

In summary, the multimedia messaging service system provided by the present invention can join a $WG^2U$ multimedia messaging service server ($WG^2U$ MMS Server), a wireless local area network (WLAN), a GSM/GPRS/UMTS mobile network and Internet. The multimedia messaging service system provided by the present invention takes advantage of features from WLAN and GSM/GPRS/UMTS mobile network, offering multimedia messaging service meeting users' expectation, i.e. efficient, low-cost as well as content-rich multimedia messaging service.

Furthermore, multimedia messaging service users can use $WG^2U$ multimedia messaging service user agent ($WG^2U$ MMS User Agent) to process multimedia messaging, including: editing, submitting, retrieving, viewing, forwarding, deleting, saving. Besides, the $WG^2U$ multimedia messaging service user can also use $WG^2U$ multimedia messaging service user agent to, via the $WG^2U$ multimedia messaging service server, submit multimedia messaging to external servers, or receive various messages from external servers. External servers are servers coupled with different networks, comprising: email server, voice mail server, multimedia messaging service server from different operators.

In addition to multimedia messaging process functions, $WG^2U$ multimedia messaging service system also offers user authentication and location management independent of GSM/GPRS/UMTS mobile network. $WG^2U$ multimedia messaging service user authentication and location management comprises: registration procedure and location update procedure. By means of registration procedure, $WG^2U$ multimedia messaging service users first acquire authentication and authorization from $WG^2U$ multimedia messaging service server, then commence to use services provided by $WG^2U$ multimedia messaging service system. Furthermore, when the location of a $WG^2U$ multimedia messaging service user changes, it is possible to obtain services from the local $WG^2U$ multimedia messaging service server by means of location update procedure, reducing network transmission time and accelerating submission and retrieval of multimedia messaging.

Aforementioned summary as well as succeeding detail description are merely exemplary, which aim to further illustrate the claims of the present invention. Whereas other objects and advantages of the present invention will be construed in the following Description and drawings.

DETAILED DESCRIPTION OF PREFERRED EMBODIMENTS

Figure 2:
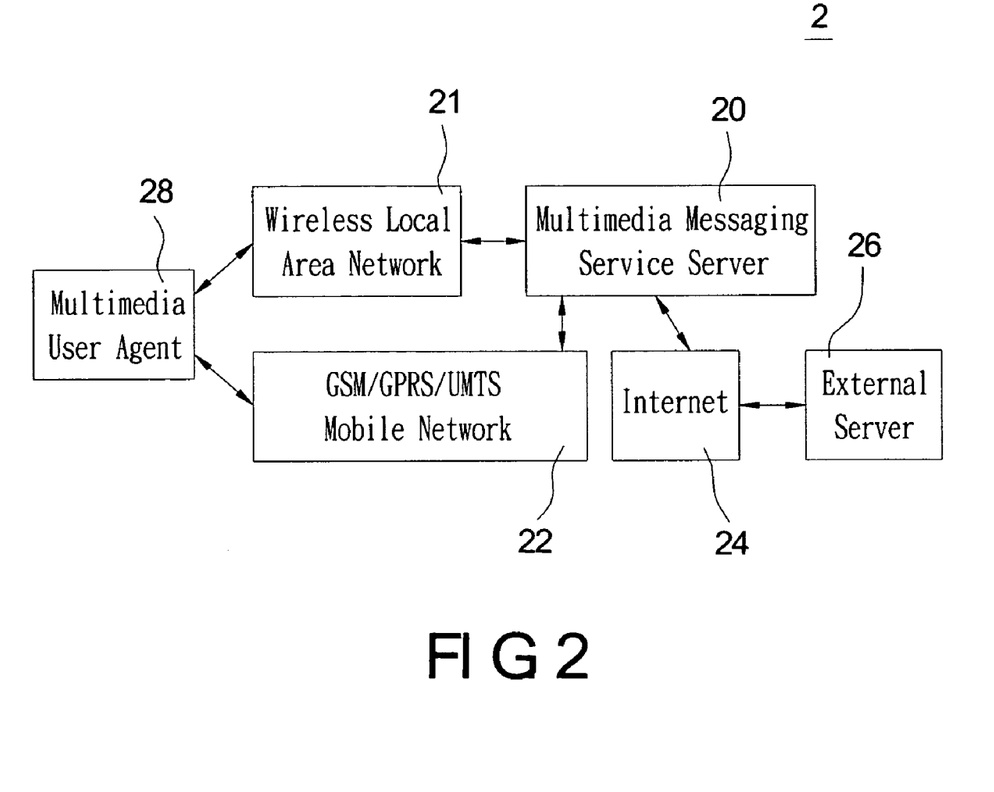
FIG. 2 illustrates a multimedia messaging service system architecture diagram of the present invention.

Referring to FIG. 2, wherein is shown a multimedia messaging service system architecture diagram of the present invention. The multimedia messaging service system 2 of the present invention provides a multimedia messaging service user (not shown) messaging-related service, in which the multimedia messaging service system 2 comprises: a multimedia messaging service server 20, a wireless local area network 21, a GSM/GPRS/UMTS mobile network 22, Internet 24, an external server 26 and a multimedia messaging service user agent 28.

In FIG. 2, the multimedia messaging service user agent 28 is installed in the multimedia messaging service user, and the multimedia messaging service user uses the multimedia messaging service user agent 28 to connect in communication the wireless local area network 21 and the GSM/GPRS/UMTS mobile network 22. The multimedia messaging service server 20 connects in communication the wireless local area network 21 and the GSM/GPRS/UMTS mobile network 22, and the multimedia messaging service server 20 can perform a user registration procedure, a messaging submission procedure, a messaging forwarding procedure, a messaging notification procedure, a messaging retrieval procedure and a user location update procedure. The Internet 24 connects in communication with the multimedia messaging service server 20, and the multimedia messaging service server 20 can link with a visited external server through the Internet 24.

In FIG. 2, the multimedia messaging service server 20 can provide the multimedia messaging service user with services such as messaging submission, messaging forwarding, messaging notification, messaging retrieval through the wireless local area network 21, the GSM/GPRS/UMTS mobile network 22 and the Internet 24.

In addition to multimedia messaging process function, the multimedia messaging service system 2 of the present invention also offers user authentication and location management functions independent of the GSM/GPRS/UMTS mobile network 22. The functions of the multimedia messaging service user authentication and location management of the present invention comprise: registration procedure and location update procedure. By means of registration procedure, the multimedia messaging service user first acquires authentication and authorization from the multimedia messaging service server 20, then commences to use messaging-related services provided by the multimedia messaging service system 2 of the present invention. Furthermore, when the location of the multimedia messaging service user changes, it is possible to obtain services from the home multimedia messaging service server 20 by means of location update procedure, reducing network transmission time and accelerating submission and retrieval of multimedia messaging.

Figure 3:
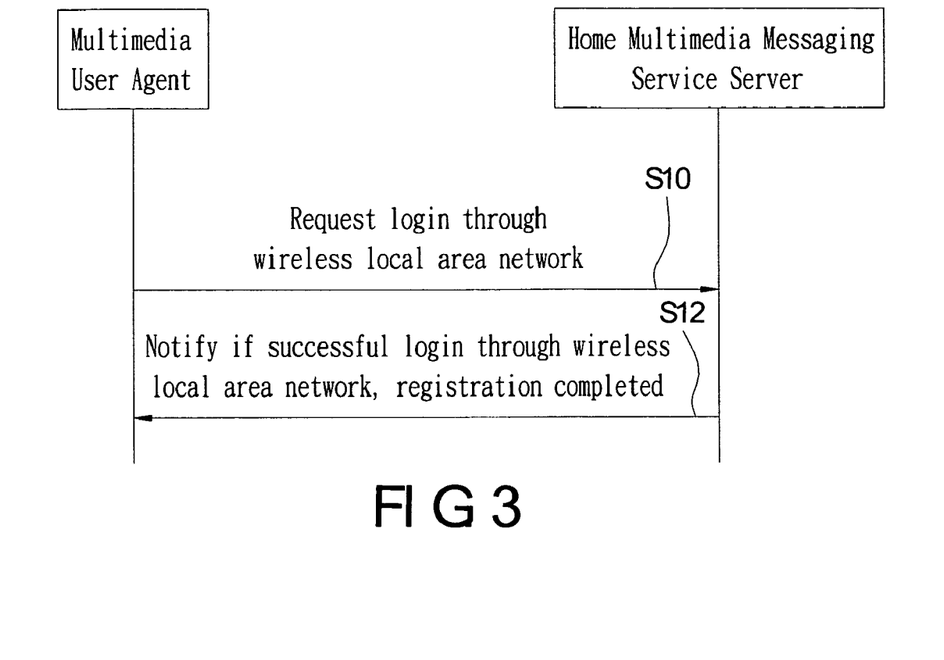
FIG. 3 illustrates a flowchart for the registration method in the multimedia messaging service of the present invention.

In accordance with FIG. 2, refer to FIG. 3, wherein a flowchart of registration method of the inventive multimedia messaging service is shown. In the multimedia messaging service system 2, the home multimedia messaging service server 20 is responsible for administration and maintenance of multimedia messaging service users, comprising: authentication, server authorization, location update, service charging. Before starting to use services provided by the multimedia messaging service system 2, the multimedia messaging service user is required to use the multimedia messaging service user agent 28 to perform registration procedure, in order to acquire the authentication and service authorization from the home multimedia messaging service server 20.

FIG. 3 illustrates the flowchart of registration procedure for a multimedia messaging service user, whose registration steps are shown as below: initially, multimedia messaging service user uses the multimedia messaging service user agent 28 to execute Explicit_Login request procedure through the wireless local area network 21, requesting to log in the home multimedia messaging service server 20 (S10). Such a request comprises the following parameters: account, password and phone number (MSISDN) of the multimedia messaging service user. Next, the home multimedia messaging service server 20 verifies the account and password of the multimedia messaging service user, and determines if there are sufficient resources for serving the multimedia messaging service user. After user verification and resource determination, the home multimedia messaging service server 20 performs Explicit_Login response procedure through the wireless local area network 21, notifying the multimedia messaging service user agent 28 whether having successfully logged into the multimedia messaging service system 2 and completed registration (S12).

Figure 4:
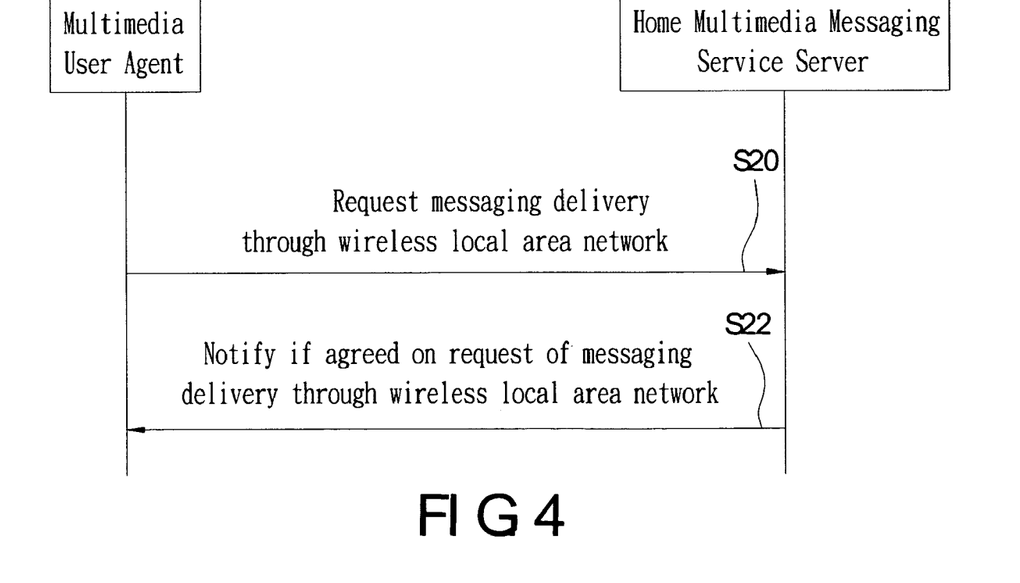
FIG. 4 illustrates a flowchart for the messaging submission method in the multimedia messaging service of the present invention.

In accordance with FIG. 2, refer to FIG. 4, wherein a flowchart of messaging submission method of the inventive multimedia messaging service is shown. After the multimedia messaging service user having completed the registration procedure and acquired the service authorization from the home multimedia messaging service server 20, the multimedia messaging service user can use the multimedia messaging service user agent 28 to request multimedia messaging submission from the home multimedia messaging service server 20.

FIG. 4 illustrates the flowchart of messaging submission procedure for a multimedia messaging service user, whose steps are shown as below: initially, the multimedia messaging service user agent 28 executes Submission request procedure via the wireless local area network 21, requesting the home multimedia messaging service server 20 to submit messaging (S20). Such a request comprises the following parameters: names of sender and receiver, phone number (MSISDN), messaging contents, messaging class, messaging capacity, messaging transfer priority, messaging legal period, and whether to reply transfer report or read note being requested. Next, after the home multimedia messaging service server 20 receives the request for messaging submission, it determines each parameter of the submission request to decide if to perform messaging submission or not. After the determination, the home multimedia messaging service server 20 executes Submission response procedure through the wireless local area network 21, notifying the multimedia messaging service user agent 28 if to accept messaging submission request (S22). Additionally, if this multimedia messaging service server 20 is not the home multimedia messaging service server of the messaging receiver, then this multimedia messaging service server 20 will perform procedure for forwarding the messaging to the home multimedia messaging service server of the messaging receiver.

Figure 5A:
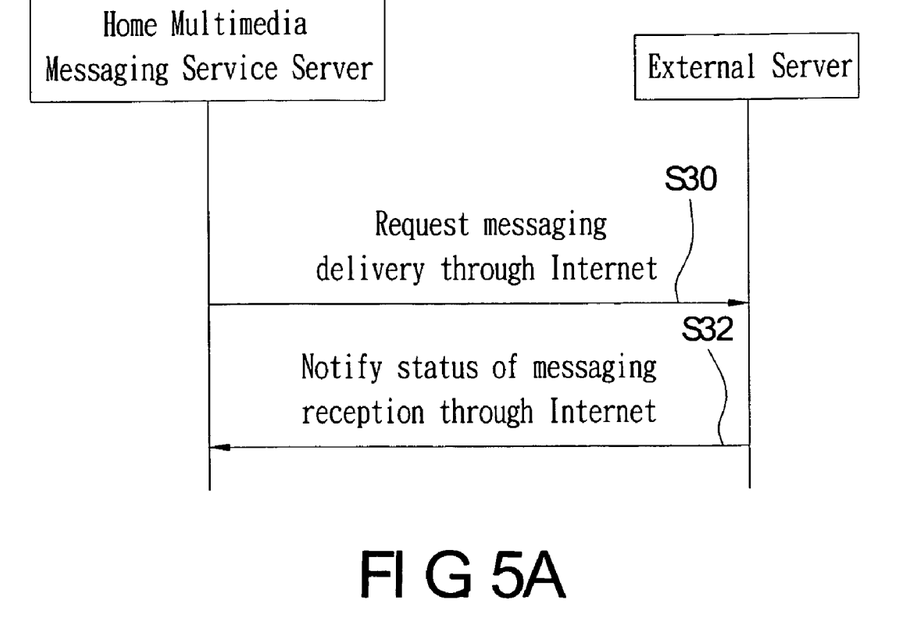
FIGS. 5A and 5B illustrate a flowchart for messaging forwarding method of the multimedia messaging service of the present invention.
Figure 5B:
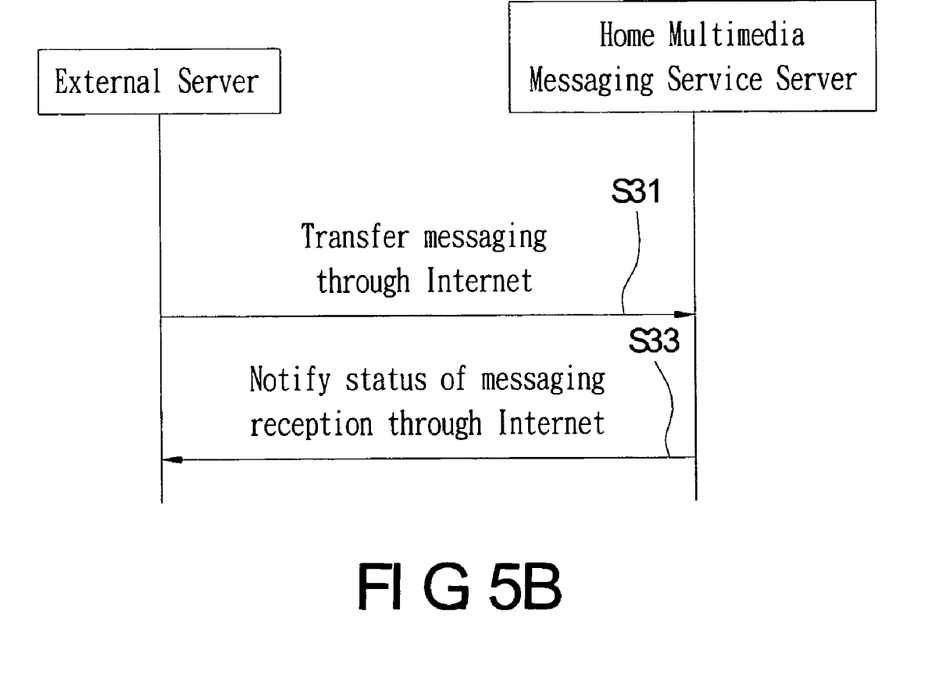

In accordance with FIG. 2, refer to FIGS. 5A and 5B, wherein a flowchart of messaging forwarding method of the inventive multimedia messaging service is shown. The home multimedia messaging service server 20 provides the function of messaging convergence, which is, multimedia messaging service user can receive messages from various servers, and submit messages to various servers as well, including email servers, voice mail servers, multimedia messaging service servers from different operators. Messaging convergence function can be achieved by means of messaging forwarding procedure. There are two cases for the messaging forwarding procedure: (A) forwarding messages from the home multimedia messaging service server 20 to the external server 26; (B) forwarding messages from the external server 26 to the home multimedia messaging service server 20.

FIG. 5A discloses a messaging forwarding flowchart for forwarding messaging from the home multimedia messaging service server 20 to the external server 26. The forwarding steps are: initially, the multimedia messaging service user requests from the home multimedia messaging service server 20 through the wireless local area network 21 to submit messaging to a user of the external server 26; next, the home multimedia messaging service server 20 will convert the messaging according to the format appointed by the external server 26, and executes Forward_External request procedure via the Internet 24, sending the name of the receiver (e.g. mail address) and contents of the message to the external server 26 (S30); upon the reception of the messaging, the external server 26 executes Forward_External response through the Internet 24, notifying the home multimedia messaging service server 20 the status of the messaging reception (S32).

FIG. 5B discloses a messaging forwarding flowchart for forwarding messaging from the external server 26 to the home multimedia messaging service server 20. The forwarding steps include: initially, the user of the external server 26 requests to send messaging to the multimedia messaging service user, then the external server 26 will execute Forward_MMS request procedure through the Internet 24, sending the name of the receiver (e.g. email address or phone number (MSISDN)) and the contents of the messaging to the home multimedia messaging service server 20 (S31); next, the home multimedia messaging service server 20 will execute Forward_MMS response procedure via the Internet 24, notifying the external server 26 the status of reception (S33). Besides, after that the home multimedia messaging service server 20 successfully received the forwarded messaging, it will find out the corresponding phone number (MSISDN) according to the name of the receiver, notifying the multimedia messaging service user to retrieve the messaging.

Figure 6:
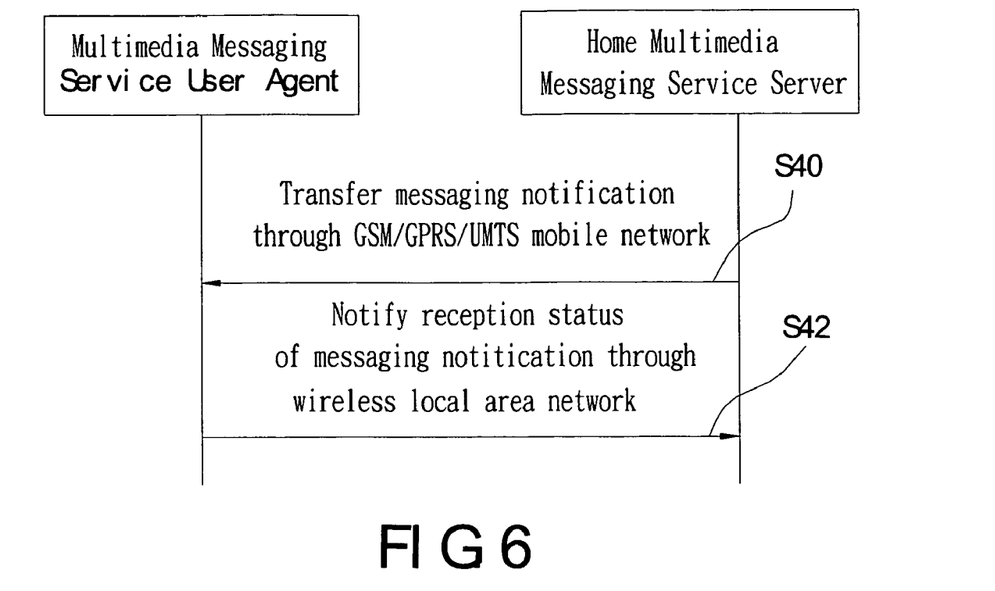
FIG. 6 illustrates a flowchart for the messaging notification method in the multimedia messaging service of the present invention.

In accordance with FIG. 2, refer to FIG. 6, wherein a flowchart of messaging notification method of the inventive multimedia messaging service is shown. Upon that the home multimedia messaging service server 20 agreed the request of messaging submission from multimedia messaging service user, if the receiver of the messaging is also one another multimedia messaging service user served by the home multimedia messaging service server 20, then the home multimedia messaging service server 20 will execute messaging notification procedure to notify the other multimedia messaging service user retrieving the messaging.

Additionally, if the home multimedia messaging service server 20 received the messaging forwarded from the external server 26, it will also activate the messaging notification procedure. FIG. 6 discloses the notification method workflow of the inventive multimedia messaging, whose steps include: initially, the home multimedia messaging service server 20 executes the Notification request procedure in accordance with the receiver's phone number (MSISDN) through the GSM/GPRS/UMTS mobile network 22, sending a messaging notification to the multimedia messaging service user agent 28 of the receiver (S40). This messaging notification comprises: name of the sender, submission date and time, messaging title, messaging class, messaging capacity, messaging legal period and identification number. Next, upon the multimedia messaging service user agent 28 received the messaging notification, it will execute the Notification response procedure through the wireless local area network 21, notifying the home multimedia messaging service server 20 if the messaging notification has been successfully received (S42).

Figure 7A:
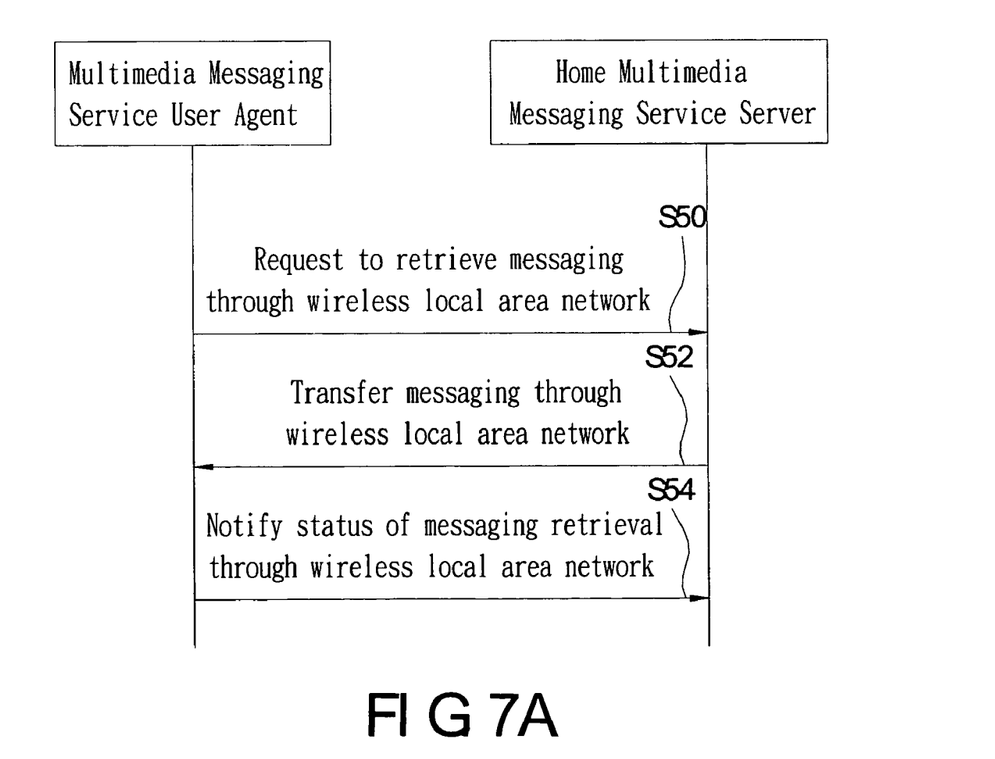
FIGS. 7A and 7B illustrate a flowchart for messaging retrieval method of the multimedia messaging service of the present invention.
Figure 7B:
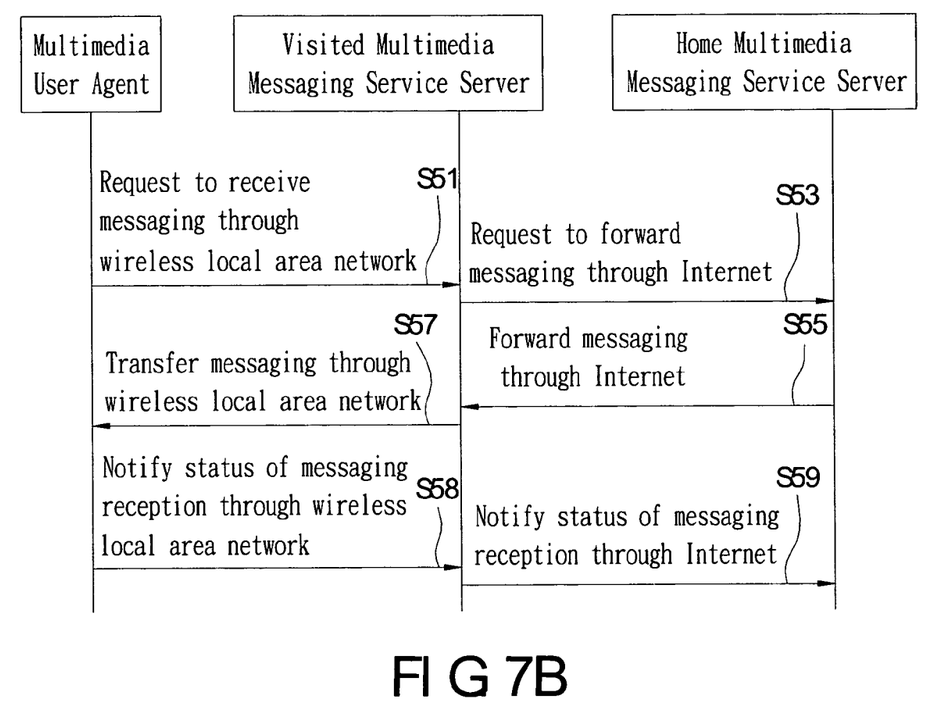

In accordance with FIG. 2, refer to FIGS. 7A and 7B, wherein a flowchart of messaging retrieval method of the inventive multimedia messaging service is shown. The home multimedia messaging service server 20 is responsible for the storage of the messaging. When the multimedia messaging service user is located in the service range of the home multimedia messaging service server 20, in case messaging retrieval is required, it will execute the procedure for retrieving messaging from the home multimedia messaging service server 20, as shown in FIG. 7A, in order to retrieving messaging from the local server 20.

But, when the multimedia messaging service user is located outside of the service range of the home multimedia messaging service server 20, when messaging retrieval is required, it will execute a procedure for retrieving messaging from the visited multimedia messaging service server (not shown), as illustrated in FIG. 7B, wherein the visited multimedia messaging service server in which the multimedia messaging service user is currently located will first acquire the messaging saved in the home multimedia messaging service server 20, then send the messaging to the multimedia messaging service user.

Refer to FIG. 7A, wherein disclosed the procedure of messaging retrieval for the multimedia messaging service user from the home multimedia messaging service server, whose steps are listed as below: initially, the multimedia messaging service user executes Retrieval request procedure by means of the multimedia messaging service user agent 28 through the wireless local area network 21, requesting messaging retrieval from the home multimedia messaging service server 20 (S50). Such a request comprises the following parameters: identification number of the messaging and name of the multimedia messaging service user. Next, the home multimedia messaging service server 20 finds out the messaging that the multimedia messaging service users would like to view, and executes the Retrieval response procedure via the wireless local area network 21, sending the messaging to the multimedia messaging service user agent 28 (S52). Then the multimedia messaging service user agent 28 executes the Retrieval_Ack request procedure through the wireless local area network 21, notifying the home multimedia messaging service server 20 if the messaging has been successfully retrieved (S54).

Refer to FIG. 7B, wherein disclosed the procedure of messaging retrieval for the multimedia messaging service user from the visited multimedia messaging service server, whose steps comprise: initially, the multimedia messaging service user executes Retrieval request procedure by means of the multimedia messaging service user agent 28 through the wireless local area network 21, requesting the messaging retrieval from the visited multimedia messaging service server (S51). Such a request comprises the following parameters: identification number of the messaging and phone number (MSISDN) of the multimedia messaging service user. Next, upon reception of such request, the visited multimedia messaging service server will execute the Retrieval_Forward request procedure via the Internet 24 in accordance with the identification number of the messaging, phone number of the multimedia messaging service user and the address of the home multimedia messaging service server 20, requesting the home multimedia messaging service server 20 to forward the messaging that the multimedia messaging service user wants to view (S53).

Then, the home multimedia messaging service server 20 finds out the messaging the multimedia messaging service users would like to view according to the identification number of the messaging, and executes the Retrieval_Forward response procedure via the wireless local area network 24, forwarding the messaging to the visited multimedia messaging service server (S55). Furthermore, the visited multimedia messaging service server executes the Retrieval response procedure through the wireless local area network 21, sending the multimedia messaging to the multimedia messaging service user agent 28 (S57). Then the multimedia messaging service user agent 28 executes the Retrieval_Ack request procedure through the wireless local area network 21, notifying the visited multimedia messaging service server if the messaging has been successfully received (S58). Finally, the visited multimedia messaging service server executes Retrival_Ack_Forward request through the Internet 24, informing the home multimedia messaging service server 20 of the status of messaging retrieval (S59).

Figure 8A:
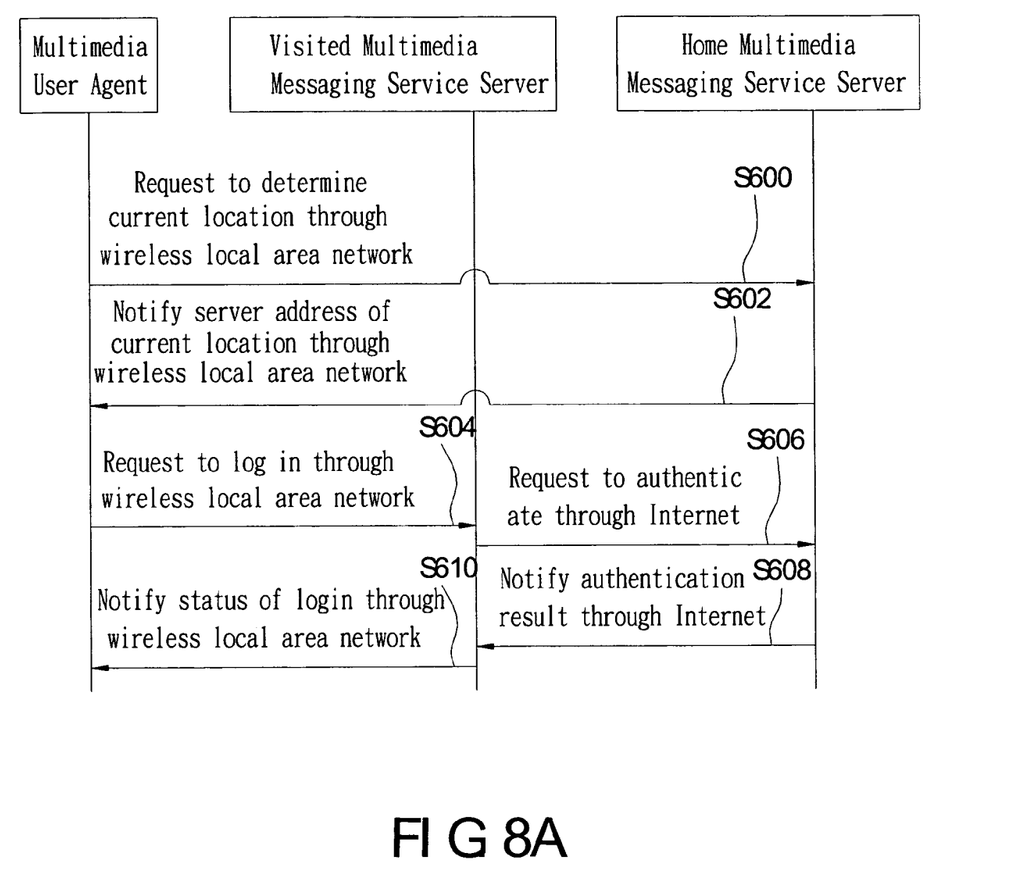
FIG. 8A to 8C illustrate flowcharts of the user location update method in the multimedia messaging service of the present invention.
Figure 8B:
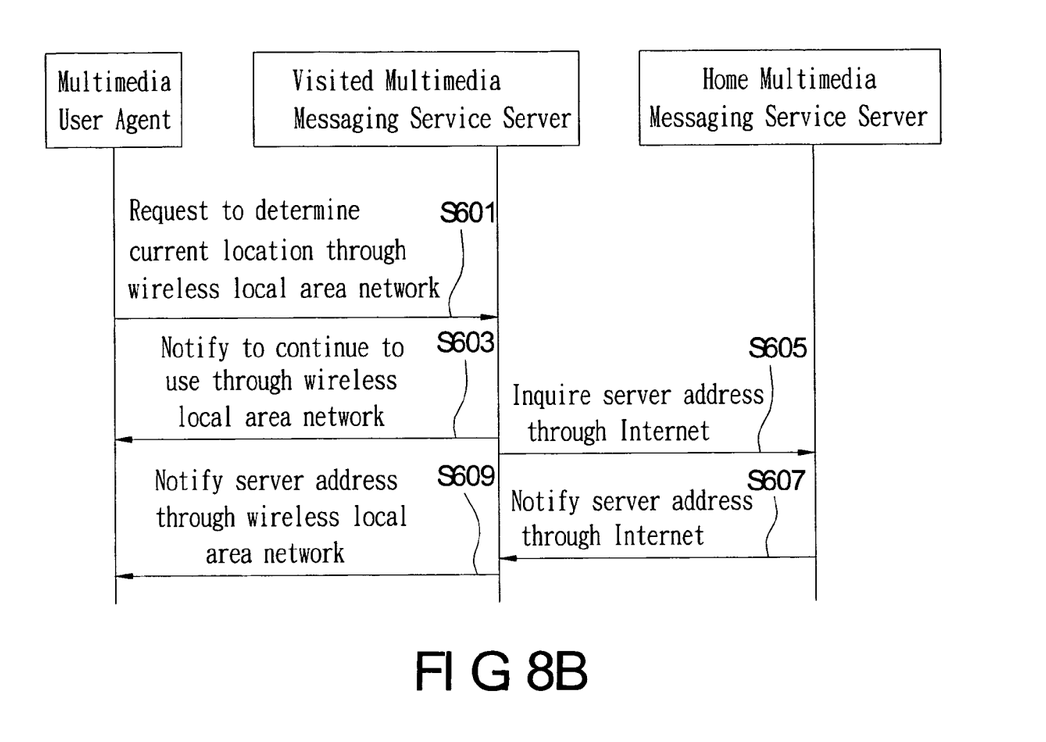
Figure 8C:
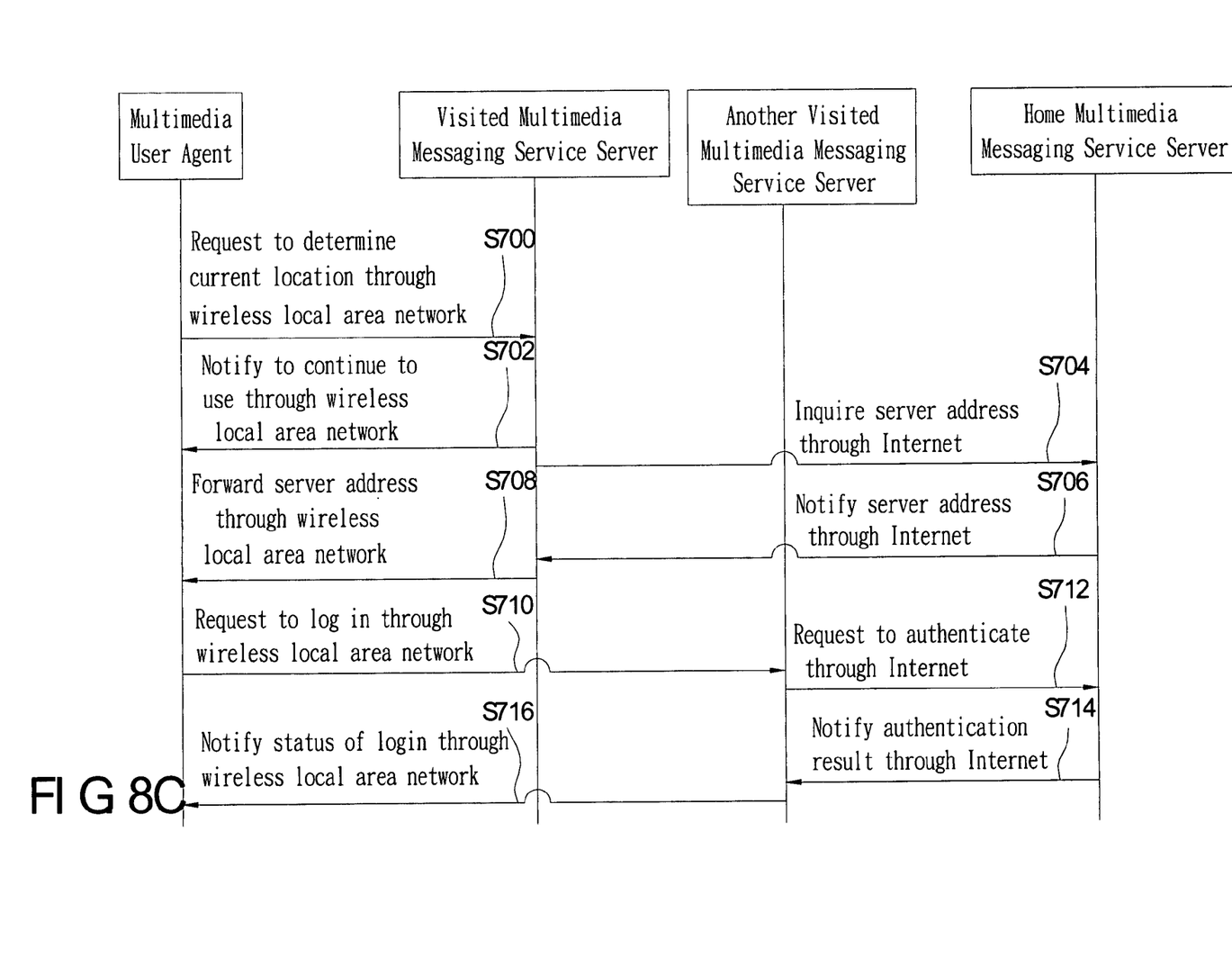

In accordance with FIG. 2, refer to FIG. 8A to 8C, wherein a flowchart of the user location update method of the inventive multimedia messaging service is shown. When the multimedia messaging service user is roaming from the service range of one home multimedia messaging service server 20 to the service range of another multimedia messaging service server (not shown), the multimedia messaging service user agent 28 will automatically execute the location update procedure, acquiring the services of the multimedia messaging service server in which the user currently located, reducing network transmission time and accelerating multimedia messaging submission and retrieval. According to the moves of the multimedia messaging service user, three possible situations might occur to the user location update procedure: (A) moving from the home multimedia messaging service server 20 to a visited multimedia messaging service server (as shown in FIG. 8A); (B) moving from a visited multimedia messaging service server to the home multimedia messaging service server 20 (as shown in FIG. 8B); (C) moving from one visited multimedia messaging service server to another visited multimedia messaging service server (as shown in FIG. 8C).

Refer to FIG. 8A, wherein the location update procedure for the multimedia messaging service user when moving from the service range of the home multimedia messaging service server to the service range of the visited multimedia messaging service server is disclosed, whose steps comprise: initially, the multimedia messaging service user agent 28 executes the Alive request procedure through the wireless local area network 21, allowing the home multimedia messaging service server 20 to determine the current location of the multimedia messaging service user by means of the IP address in the connection information (S600), and to decide if to activate location update procedure based on this location information. Next, to determine if the multimedia messaging service user is located in the service range of the home multimedia messaging service server 20; if yes, then the home multimedia messaging service server 20 executes the Alive response procedure through the wireless local area network 21, notifying the multimedia messaging service user agent 28 that it is allowed to continue to use the multimedia messaging service, and the execution of the location update procedure ends.

Contrarily, in case the multimedia messaging service user is located in the service range of the visited multimedia messaging service server, then the home multimedia messaging service server 20 will execute the Alive response procedure via the wireless local area network 21, informing the multimedia messaging service user agent 28 of the IP address of the visited multimedia messaging service server as well as the temporary password of the multimedia messaging service user (S602). Upon appreciating the IP address of the visited multimedia messaging service server, the multimedia messaging service user agent 28 executes the Implicit_Login request procedure through the wireless local area network 21, requesting to log in the visited multimedia messaging service server (S604). This request comprises the following parameters: account, temporary password and phone number (MSISDN) of the multimedia messaging service user.

If there are sufficient system resources for serving the multimedia messaging service user about to log in, then the visited multimedia messaging service server will execute Update request procedure through the Internet 24, requesting the home multimedia messaging service server 20 to authenticate the account and password (S606). This request comprises the following parameters: account, temporary password and phone number (MSISDN) of the multimedia messaging service user. Following this, the home multimedia messaging service server 20 executes the Update response procedure via the Internet 24, informing the visited multimedia messaging service server of the authentication result concerning the multimedia messaging service user, meanwhile the home multimedia messaging service server 20 updates accordingly the location information of the multimedia messaging service user (S608). Finally, the visited multimedia messaging service server executes Implicit_Login response procedure through the wireless local area network 21, notifying the multimedia messaging service user agent 28 whether the multimedia messaging service user can login and use the multimedia messaging services (S610).

Refer to FIG. 8B, wherein the location update procedure for the multimedia messaging service user when moving from the service range of the visited multimedia messaging service server to the service range of the home multimedia messaging service server is disclosed, whose steps comprise: initially, the multimedia messaging service user agent 28 executes the Alive request procedure through the wireless local area network 21, allowing the visited multimedia messaging service server to determine the current location of the multimedia messaging service user by means of the IP address in the connection information (S601), and to decide if to activate location update procedure based on this location information. Next, to determine if the multimedia messaging service user is located in the service range of the visited multimedia messaging service server; if yes, then the visited multimedia messaging service server executes the Alive response procedure through the wireless local area network 21, notifying the multimedia messaging service user agent 28 that it is allowed to continue to use the multimedia messaging service (S603), and the execution of the location update procedure ends.

Contrarily, since the visited multimedia messaging service server only appreciates the multimedia messaging service user is already not in its service range, but no idea about the server address within which the multimedia messaging service user currently located; hence, via the Internet 24, the Alive_Forward request will be executed to inquire the server address at which location the multimedia messaging service user currently located from the home multimedia messaging service server 20 (S605). This inquiry comprises the following parameters: IP address, temporary password and phone number (MSISDN) of the multimedia messaging service user. After authentication of password, the home multimedia messaging service server 20 updates the location information about the multimedia messaging service user, meanwhile, the home multimedia messaging service server executes the Alive_Forward response procedure through the Internet 24, informing the visited multimedia messaging service server that the multimedia messaging service user is located in the service range of the home multimedia messaging service server 20 (S607). Finally the visited multimedia messaging service server executes the Alive response procedure via the wireless local area network 21, forwarding the address of the home multimedia messaging service server 20 to the multimedia messaging service user agent 28, then the multimedia messaging service user can start to use services provided by the home multimedia messaging service server 20 (S609).

Refer to FIG. 8C, wherein the location update procedure for the multimedia messaging service user when moving from the service range of one visited multimedia messaging service server to the service range of another visited multimedia messaging service server is disclosed, whose steps comprise: initially, the multimedia messaging service user agent 28 executes the Alive request procedure through the wireless local area network 21, allowing the visited multimedia messaging service server to determine the current location of the multimedia messaging service user by means of the IP address in the connection information (S700), and to decide if to activate location update procedure based on this location information. Next, to determine if the multimedia messaging service user is located in the service range of the visited multimedia messaging service server; if yes, then the visited multimedia messaging service server executes the Alive response procedure through the wireless local area network 21, notifying the multimedia messaging service user agent 28 that it is allowed to continue to use the multimedia messaging service (S702), and the execution of the location update procedure ends.

Contrarily, since the visited multimedia messaging service server only appreciates the multimedia messaging service user is already not in its service range, but no idea about the server address within which the multimedia messaging service user currently located; hence, via the Internet 24, the Alive_Forward request procedure will be executed to inquire the server address within which the multimedia messaging service user currently located from the home multimedia messaging service server 20 (S704). This inquiry comprises the following parameters: IP address, temporary password and phone number (MSISDN) of the multimedia messaging service user. After the password authentication, the home multimedia messaging service server 20 determines, according to the IP address of the multimedia messaging service user, the current location of the multimedia messaging service user is located in the service range of another visited multimedia messaging service server. Next, the home multimedia messaging service server 20 executes Alive_Forward response procedure via the Internet 24, notifying the visited multimedia messaging service server that the multimedia messaging service user is located in the service range of another visited multimedia messaging service server (S706). Following this, the visited multimedia messaging service server executes Alive response procedure through the wireless local area network 21, forwarding the IP address of another visited multimedia messaging service server to the multimedia messaging service user agent 28 (S708).

Upon appreciating the IP address of another visited multimedia messaging service server, the multimedia messaging service user agent 28 executes the Implicit_Login request procedure through the wireless local area network 21, requesting to log in the other visited multimedia messaging service server (S710). This request comprises the following parameters: account, temporary password and phone number (MSISDN) of the multimedia messaging service user. If there are sufficient system resources for serving the multimedia messaging service user about to log in, then another visited multimedia messaging service server will execute Update request procedure through the Internet 24, requesting the home multimedia messaging service server 20 to authenticate the account and password (S712). This request comprises the following parameters: account, temporary password and phone number (MSISDN) of the multimedia messaging service user. Following this, the home multimedia messaging service server 20 executes the Update response procedure via the Internet 24, informing another visited multimedia messaging service server of the authentication result concerning the multimedia messaging service user, meanwhile the home multimedia messaging service server 20 updates accordingly the location information of the multimedia messaging service user (S714). Finally, another visited multimedia messaging service server executes Implicit_Login response procedure through the wireless local area network 21, notifying the multimedia messaging service user agent 28 whether the multimedia messaging service user can login and use the multimedia messaging services (S716).

In summary of the aforementioned discussions, the multimedia messaging service system of the present invention uses the multimedia messaging service server 20 to connect in communication with the wireless local area network 21, the GSM/GPRS/UMTS mobile network 22 and the Internet 24, realizing the procedures of user registration, messaging submission, messaging forwarding, messaging notification, messaging retrieval and location update, with a view to construct the WG$^2$U (WLAN and GSM/GPRS/UMTS) multimedia messaging service system consisting of the following features:

1. Instant messaging notification: WG$^2$U multimedia messaging service users will receive instantaneously notification for message arrival, relevant information of notification message, including: sender's address, message subject, class, size, priority and media type etc.

2. Content-rich and high-speed messaging access: WG$^2$U multimedia messaging service users can rapidly submit and retrieve multimedia messaging with integral and diverse contents, including: texts, pictures, audio, video and the like.

3. Convergent messaging service: WG$^2$U multimedia messaging service users can receive messaging from various types of servers, and submit messaging to thereto as well, including: email server, voice box server and so on.

4. Operator-independent user management: WG$^2$U multimedia messaging service system offers user authentication and location management method independent of GSM/GPRS/UMTS mobile network, allowing business operations of multimedia messaging service, without restrictions from GSM/GPRS/UMTS mobile network system operators.

However, the above-mentioned illustrations merely represent the detailed descriptions and drawings for one of the preferred embodiments of the present invention, and any one skilled in field of the art can easily consider the variations or modifications encompassed by spirit and range of the following claims of the application.

What is claimed is:

1. A multimedia messaging service method of a multimedia messaging service system, wherein the system comprises:
    a wireless local area network;
    a global system for mobile communication (GSM)/general packet radio service (GPRS)/universal mobile telecommunication system (UMTS) mobile network;
    a multimedia messaging service user agent installed in a multimedia messaging service user, wherein the multimedia messaging service user agent is connected in communication with the wireless local area network and the GSM/GPRS/UMTS mobile network;
    a home multimedia messaging service server, which is in communication with the wireless local area network and the GSM/GPRS/UMTS mobile network, wherein the multimedia messaging service server performs a user registration procedure, a messaging submission procedure, a messaging forwarding procedure, a messaging notification procedure, a messaging retrieval procedure and a user location update procedure;
    an Internet, which is in communication with the home multimedia messaging service server; and
    an external server, which is in communication with the Internet;
    wherein, the home multimedia messaging service server provides services of a user registration, a user location update, a messaging submission, a messaging forwarding and a messaging retrieval through the wireless local area network and the Internet for the multimedia messaging service user, and the GSM/GPRS/UMTS mobile network provides a service of a messaging notification for the multimedia messaging service user;
the multimedia messaging service method comprising:
    the multimedia messaging service user agent requesting to log in the home multimedia messaging service server through the wireless local area network;
    the home multimedia messaging service server authenticating the multimedia messaging service user;
    the home multimedia messaging service server determining if there are sufficient resources to serve the multimedia messaging service user;
    the home multimedia messaging service server notifying through the wireless local area network if the multimedia messaging service user has completed the registration;
    the multimedia messaging service user agent requesting the multimedia messaging service server to submit a messaging through the wireless local area network;
    the home multimedia messaging service server determines parameters of the messaging to decide if to submit the messaging, the parameters of the messaging comprise names of a sender and a receiver, a phone number, messaging contents, a messaging class, a messaging capacity, a messaging transfer priority, a messaging legal period, and whether requested to reply transfer report or read note; and
    the home multimedia messaging service server notifying the multimedia messaging service user through the wireless local area network if accepting a request for the multimedia messaging service server to submit the messaging.

2. The multimedia messaging service method as claimed in claim 1, wherein in the step of the home multimedia messaging service server authenticating the multimedia messaging service user, the home multimedia messaging service server is configured to authenticate an account, a password and a phone number of the multimedia messaging service user.

3. The multimedia messaging service method as claimed in claim 1, wherein if the home multimedia messaging service server is not the home multimedia messaging service server of the messaging receiver, then the home multimedia messaging service server forwards the messaging to the home multimedia messaging service server of the messaging receiver.

4. The multimedia messaging service method as claimed in claim 1, further comprising:
   the multimedia messaging service user agent requesting the home multimedia messaging service server through the wireless local area network to deliver the messaging;
   the multimedia messaging service server transferring the messaging to the multimedia messaging service user agent through the wireless local area network; and
   the multimedia messaging service user agent replying to the home multimedia messaging service server through the wireless local area network if the messaging notification has been received.

5. The multimedia messaging service method as claimed in claim 4, wherein in the step that the multimedia messaging service user agent requests the home multimedia messaging service server through the wireless local area network to deliver the messaging, the multimedia messaging service user agent is configured to provide an identification number of the messaging and the name of the multimedia messaging service user to the home multimedia messaging service server.

6. The multimedia messaging service method as claimed in claim 4, further comprising:
   the multimedia messaging service user agent requesting a visited multimedia messaging service server through a wireless local area network to receive the messaging;
   the visited multimedia messaging service server requesting the home multimedia messaging service server through the Internet to send the messaging;
   the home multimedia messaging service server transferring the messaging to the visited home multimedia messaging service server through the Internet;
   the visited multimedia messaging service server transferring the messaging to the multimedia messaging service user agent through the wireless local area network;
   the multimedia messaging service user agent replying to the visited multimedia messaging service server through the wireless local area network if the messaging has been received; and
   the visited multimedia messaging service server informing the home multimedia messaging service server of a messaging retrieval status.

7. The multimedia messaging service method as claimed in claim 6, wherein in the step that the multimedia messaging service user agent requests the visited multimedia messaging service server through the wireless local area network to send the messaging, the multimedia messaging service user agent is configured to provide an identification number of the messaging and a name of the multimedia messaging service user to the visited multimedia messaging service server.

8. The multimedia messaging service method as claimed in claim 6, wherein in the step that the visited multimedia messaging service server requests the home multimedia messaging service server through the Internet to send the messaging, the visited multimedia messaging service server requests the home multimedia messaging service server to send the messaging based on the identification number of the messaging, the name of the multimedia messaging service user and an address of the home multimedia messaging service server.

9. The multimedia messaging service method as claimed in claim 1, further comprising:
   the multimedia messaging service user agent requesting the home multimedia messaging service server through the wireless local area network to determine a location of the multimedia messaging service user;
   the home multimedia messaging service server determining if the multimedia messaging service user is located in a service range of the home multimedia messaging service server;
   if the multimedia messaging service user is not in the service range of the home multimedia messaging service server, then the multimedia messaging service user is in the service range of the visited multimedia messaging service server;
   the home multimedia messaging service server informing the multimedia messaging service user agent through the wireless local area network of an internet protocol (IP) address of the visited multimedia messaging service server and a temporary password;
   the multimedia messaging service user agent requesting through the wireless local area network to log in the visited multimedia messaging service server;
   the visited multimedia messaging service server requesting the home multimedia messaging service server through the Internet to authenticate the multimedia messaging service user;
   the home multimedia messaging service server informing the visited multimedia messaging service server through the Internet of an authentication result, and updating the location of the multimedia messaging service user; and
   the visited multimedia messaging service server notifying the multimedia messaging service user agent through the wireless local area network if the multimedia messaging user agent logs in to the visited multimedia messaging service server.

10. The multimedia messaging service method as claimed in claim 9, wherein in the step that the home multimedia messaging service server determines if the location of the multimedia messaging service user is in the service range of the home multimedia messaging service server, further comprises if the multimedia messaging service user is in the service range of the home multimedia messaging service server, the home multimedia messaging service server notifies the multimedia messaging service user agent through the wireless local area network of a continuing communication with the home multimedia messaging service server.

11. The multimedia messaging service method as claimed in claim 9, wherein in the step that the multimedia messaging service user agent requests through the wireless local area network to log in the visited multimedia messaging service server, the visited multimedia messaging service server is configured to authenticate the account, the temporary password and the phone number of the multimedia messaging service user.

12. The multimedia messaging service method as claim 9, wherein in the step that the visited multimedia messaging service server requests the home multimedia messaging service server through the Internet to authenticate the multimedia messaging service user, the home multimedia messaging service server is configured to authenticate the account, the temporary password and the phone number of the multimedia messaging service user.

13. The multimedia messaging service method as claimed in claim 9, further comprising:

the multimedia messaging service user agent requesting the visited multimedia messaging service server through the wireless local area network to determine the location of the multimedia messaging service user;

the visited multimedia messaging service server determining if the multimedia messaging service user is located in the service range of the visited multimedia messaging service server;

if the multimedia messaging service user is not in the service range of the visited multimedia messaging service server, the visited multimedia messaging service server inquiring a server address for the multimedia messaging service user through the Internet from the home multimedia messaging service server;

the home multimedia messaging service server updating the location of the multimedia messaging service user;

the home multimedia messaging service server notifying the visited multimedia messaging service server through the Internet that the multimedia messaging service user is in the service range of the home multimedia messaging service server; and the visited multimedia messaging service server informing the multimedia messaging service user agent through the wireless local area network of the server address of the home multimedia messaging service server.

14. The multimedia messaging service method as claimed in claim 13, wherein in the step that the visited multimedia messaging service server determines if the location of the multimedia messaging service user is in the service range of the visited multimedia messaging service server, when the multimedia messaging service user is in the service range of the visited multimedia messaging service server, the visited multimedia messaging service server notifies the multimedia messaging service user agent through the wireless local area network that the user logs in to the visited multimedia messaging service server.

15. The multimedia messaging service method as claimed in claim 13, wherein in the step that the visited multimedia messaging service server requests the home multimedia messaging service server through the Internet to provide the server address of the home multimedia messaging service server, the home multimedia messaging service server is configured to authenticate the IP address, the temporary password and the phone number of the multimedia messaging service user.

16. The multimedia messaging service method as claimed in claim 9, further comprising:

the multimedia messaging service user agent requesting the visited multimedia messaging service server through the wireless local area network to determine the location of the multimedia messaging service user;

the visited multimedia messaging service server determining that if the multimedia messaging service user is located in the service range of the visited multimedia messaging service server;

if the multimedia messaging service user is not in the service range of the visited multimedia messaging service server, the visited multimedia messaging service server inquiring the server address through the Internet from the home multimedia messaging service server;

the home multimedia messaging service server determining the server address of another visited multimedia messaging service server;

the home multimedia messaging service server notifying the visited multimedia messaging service server through the Internet that the multimedia messaging service user is in the service range of another visited multimedia messaging service server;

the visited multimedia messaging service server informing the multimedia messaging service user agent through the wireless local area network of the server address of another visited multimedia messaging service server;

the multimedia messaging service user agent requesting to log in another visited multimedia messaging service server;

another visited multimedia messaging service server requesting the home multimedia messaging service server through the Internet to authenticate the multimedia messaging service user;

the home multimedia messaging service server informing another visited multimedia messaging service server through the Internet of an authentication result, and updating the location of the multimedia messaging service user; and the another visited multimedia messaging service server notifying the multimedia messaging service user agent through the wireless local area network that the multimedia messaging service user agent logs in another visited multimedia messaging service server.

17. The multimedia messaging service method as claimed in claim 16, wherein in the step that the visited multimedia messaging service server determines if the multimedia messaging service user is in the service range of the visited multimedia messaging service server, when the multimedia messaging service user is in the service range of the visited multimedia messaging service server, the visited multimedia messaging service server notifies the multimedia messaging service user agent through the wireless local area network of a continuing login of the visited multimedia messaging service server for the multimedia messaging service user.

18. The multimedia messaging service method as claimed in claim 16, wherein in the step that the visited multimedia messaging service server requests the home multimedia messaging service server through the Internet to provide the server address of another visited multimedia messaging service server, the home multimedia messaging service server is configured to authenticate the IP address, the temporary password and the phone number of the multimedia messaging service user.

19. The multimedia messaging service method as claimed in claim 16, wherein in the step that the multimedia messaging service user agent requests to log in another visited multimedia messaging service server, another visited multimedia messaging service server is configured to authenticate the account, the temporary password and the phone number of the multimedia messaging service user.

20. The multimedia messaging service method as claimed in claim 16, wherein in the step that another visited multimedia messaging service server requests the home multimedia messaging service server through the Internet to authenticate the multimedia messaging service user, the home multimedia messaging service server is configured to authenticate the account, the temporary password and the phone number of the multimedia messaging service user.

21. A multimedia messaging service method of a multimedia messaging service system, the system comprising:

a wireless local area network;

a global system for mobile communication (GSM)/general packet radio service (GPRS)/universal mobile telecommunication system (UMTS) mobile network;

a multimedia messaging service user agent installed in a multimedia messaging service user, wherein the multimedia messaging service user agent is connected in communication with the wireless local area network and the GSM/GPRS/UMTS mobile network;

a home multimedia messaging service server, which is in communication with the wireless local area network and the GSM/GPRS/UMTS mobile network, wherein the multimedia messaging service server performs a user registration procedure, a messaging submission procedure, a messaging forwarding procedure, a messaging notification procedure, a messaging retrieval procedure and a user location update procedure;

an Internet, which is in communication with the home multimedia messaging service server;

an external server, which is in communication with the Internet;

the multimedia messaging service user agent requesting the home multimedia messaging service server to submit the messaging through the wireless local area network to the external server;

the home multimedia messaging service server converting a data format of the messaging;

the home multimedia messaging service server transferring the converted messaging to the external server through the Internet;

the external server notifying the home multimedia messaging service server through the Internet if the messaging has been successfully received;

wherein, the home multimedia messaging service server provides services of a user registration, a user location update, a messaging submission, a messaging forwarding and a messaging retrieval through the wireless local area network and the Internet for the multimedia messaging service user, and the GSM/GPRS/UMTS mobile network provides a service of a messaging notification for the multimedia messaging service user;

the multimedia messaging service method comprising:
the multimedia messaging service user agent requesting to log in the home multimedia messaging service server through the wireless local area network;
the home multimedia messaging service server authenticating the multimedia messaging service user;
the home multimedia messaging service server determining if there are sufficient resources to serve the multimedia messaging service user; and
the home multimedia messaging service server notifying through the wireless local area network if the multimedia messaging service user has completed the registration.

22. The multimedia messaging service method as claimed in claim 21, further comprising:
the external server delivers the messaging to the home multimedia messaging service server through the Internet;
the home multimedia messaging service server notifying the external server through the Internet if the messaging has been successfully received; and
the home multimedia messaging service server notifying the multimedia messaging service user according to a data in the messaging.

23. A multimedia messaging service method of a multimedia messaging service system, the system comprising:
a wireless local area network;
a global system for mobile communication (GSM)/general packet radio service (GPRS)/universal mobile telecommunication system (UMTS) mobile network;
a multimedia messaging service user agent installed in a multimedia messaging service user, wherein the multimedia messaging service user agent is connected in communication with the wireless local area network and the GSM/GPRS/UMTS mobile network;
a home multimedia messaging service server, which is in communication with the wireless local area network and the GSM/GPRS/UMTS mobile network, wherein the multimedia messaging service server performs a user registration procedure, a messaging submission procedure, a messaging forwarding procedure, a messaging notification procedure, a messaging retrieval procedure and a user location update procedure;
an Internet, which is in communication with the home multimedia messaging service server;
an external server, which is in communication with the Internet;
the home multimedia messaging service server transferring a messaging notification to the multimedia messaging service user agent through the GSM/GPRS/UMTS mobile network according to the phone number of the multimedia messaging service user;
the multimedia messaging service user agent replying to the home multimedia messaging service server through the wireless local area network if the messaging notification has been received;
wherein, the home multimedia messaging service server provides services of a user registration, a user location update, a messaging submission, a messaging forwarding and a messaging retrieval through the wireless local area network and the Internet for the multimedia messaging service user, and the GSM/GPRS/UMTS mobile network provides a service of a messaging notification for the multimedia messaging service user, the messaging notification comprises a name of a sender, a submission date and time, a messaging title, a messaging class, a messaging capacity, a messaging legal period and identification number;
the multimedia messaging service method comprising:
the multimedia messaging service user agent requesting to log in the home multimedia messaging service server through the wireless local area network;
the home multimedia messaging service server authenticating the multimedia messaging service user;
the home multimedia messaging service server determining if there are sufficient resources to serve the multimedia messaging service user; and
the home multimedia messaging service server notifying through the wireless local area network if the multimedia messaging service user has completed the registration.

* * * * *